United States Patent Office 2,910,469
Patented Oct. 27, 1959

2,910,469

NEW 21-HYDROXY-STEROID COMPOUNDS SUBSTITUTED IN 21-POSITION BY A HETEROCYCLIC RADICAL AND PROCESS OF PREPARING SAME

Karl Hoffmann and Jules Heer, Binningen, Switzerland, assignors to Ciba Pharmaceutical Products Inc., Summit, N.J.

No Drawing. Application October 1, 1957
Serial No. 687,371

Claims priority, application Switzerland October 3, 1956

8 Claims. (Cl. 260—239.5)

This invention relates to steroids containing in 21-position a hydroxyl group and in 20-position a hydroxyl group and a pyridyl or piperidyl radical, their esters and salts thereof, and to processes for their manufacture.

More particularly the invention concerns steroids which are substituted as indicated above and belong to the allopregnane or pregnane series. These steroids may also be homo- and/or nor compounds. They may be saturated or unsaturated. Thus, they may possess a double bond proceeding from the carbon atom 5.

The new compounds can be substituted in any way, for example preferably in the steroid portion by free or esterified hydroxyl groups or free or functionally converted oxo groups or halogen atoms and on the piperidyl nitrogen atom by an alkyl, acyl or aralkyl radical. An esterified hydroxyl group is preferably a hydroxyl group esterified with an aliphatic, alicyclic, araliphatic, aromatic or heterocyclic carboxylic acid, thione carboxylic acid, thiol carboxylic acid or sulfonic acid with 1–20 C-atoms. As acids there may be mentioned unsubstituted or hydroxy or halogen substituted fatty acids, such as, for example, acetic acid, chloracetic acid, trifluoracetic acid, propionic acid, butyric acids, valeric acids, trimethyl-acetic acid, diethyl acetic acid, caproic acids, enanthic acids, capric acids, palmitic acid, crotonic acid, undecanic acid, undecyleneic acid, oxalic aid, succinic acid, pimelic acid, maleic acid, lactic acid, and further, carbamic acids, β-cyclopentylpropionic acid, benzoic acid, phenylacetic acid, cyclohexylacetic acid, furane-2-carboxylic acid, methane sulfonic acid and toluene sulfonic acids. The hydroxyl groups in 20- and 21-position can also be esterified with the above specified acids. Functionally converted oxo groups are for example ketalized oxo groups, such as the ethylene dioxy group.

As N-substituents low alkyl radicals or the acyl radicals of low fatty acids, benzoic acids or simple aryl fatty acids, and more particularly the methyl or acetyl radicals are preferred.

The new compounds possess valuable pharmacological properties. Thus they have a cardial activity particularly a coronary dilatative effect and can therefore be used as medicaments.

Very valuable are pregnane and allopregnane compounds of the specified type which are oxygenated in 3-position, e.g. contain in 3-position a free or esterified hydroxyl group or a free or functionally converted oxo group and in ring A are saturated or possess a double bond proceeding from the carbon atom 5. The pyridyl or piperidyl radical is in this case advantageously linked in 2-position with the steroid structure. Specific and preferred embodiments of the invention are : Δ5-3β:20:21-trihydroxy-20-pyridyl-(2')-pregnene of the formula:

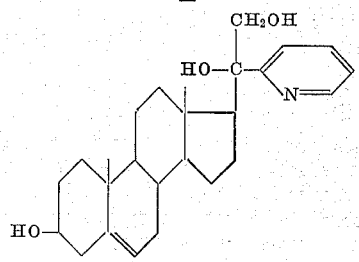

and 3β:21-diacetoxy-20-hydroxy-20-piperidyl - (2') - allopregnane and their esters and the N-substitution products.

The new compounds are obtained when 20-oxo-pregnanes of which the grouping in 21-position is a free or esterified oxymethyl group are reacted with pyridyl-lithium compounds e.g. pyridyl-(2)-lithium. The resulting 20-hydroxyl-20-pyridyl-compounds may be treated with agents capable of reducing the pyridine ring. In any sequence, in resulting compounds double bonds may be introduced or double bonds saturated, free hydroxyl or oxo groups esterified or functionally converted, respectively, free hydroxyl groups oxidized to oxo groups, oxo groups reduced to hydroxyl groups, hydroxyl or oxo groups removed or introduced and hydroxyl groups functionally esterified converted oxo groups liberated. Resulting compounds may be N-substituted or N-acylated compounds hydrolysed; resulting bases may be converted into their salts or resulting salts into the free bases.

The reaction according to the invention with the pyridyl-(2)-lithium, is carried out in the customary manner, for example in an inert diluent and the reaction mixture worked up in the customary manner, for example in an acid medium. If acyloxy groups are present in the molecule, these are thereby split up to form free hydroxyl groups.

As agent capable of reducing the pyridine ring there may be mentioned primarily hydrogen in the presence of a catalyst, preferably a noble metal catalyst, such as platinum, or also nickel or copper chromite, or also nascent hydrogen, as is produced, for example, by treatment of sodium with an alcohol, for example butanol, or lithium with liquid ammonia. According to the selection of the reduction conditions, double bonds present in the steroid molecule are saturated.

Any subsequent reactions to be carried out in the steroid moiety or on the nitrogen, such as hydrolysis of an acyloxy group, oxidation of a hydroxyl group, N-acylation, N-alkylation, hydrolysis of an N-acyl group, introduction or saturation of a double bond and so on, are carried out in the customary manner, if desired with protection of other groups not intended to undergo reaction.

The new compounds are obtained according to the reaction conditions in the form of the free amine bases or their salts. The free bases can be converted into their therapeutically useful acid addition salts in the customary manner, while the latter can be converted into the free bases also in the customary manner. As salts are concerned those of inorganic or organic acids, for example those of the hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene or toluene sulfonic acid or therapeutically active acids.

The new compounds can be used as medicaments, for example in the form of pharmaceutical preparations which contain them or their salts in admixture with a pharmaceutical organic or inorganic carrier material suitable for enteral or parenteral administration. For the production thereof such substances are concerned as do not react with the new compounds, for example water, gelatine, lactose, starch, magnesium stearate, talc vegetable oils, benzyl alcohols, gums, polyalkylene glycols, petroleum jelly, cholesterol or other known medicament carriers. The pharmaceutical preparations can be made up, for example, as tablets or dragees, or in liquid form as solutions, suspensions, or emulsions. If desired they are sterilized and/or contain auxiliary substances, such as preserving, stabilizing, wetting or emulsifying agents, salts for variation of the osmotic pressure or buffer substances. They can also contain other therapeutically valuable substances.

The starting materials are known or can be obtained according to processes known per se.

The following examples illustrate the invention:

Example 1

To a pyridyl-lithium solution prepared from 2.1 grams of lithium, 200 ml. of ether, 24 grams of bromobenzene and 24 grams of 2-bromopyridine in 100 ml. of benzene there is added within 30 minutes at —30 to —40° C. a solution of 10.4 grams of $\Delta^5$-3$\beta$:21-diacetoxy-pregnene-20-one and the whole is then stirred further for 3 hours at —40° C. After the addition of 2 N-hydrochloric acid and, if desired, methanol to form a solution, the base is precipitated from the acid solution with aqueous ammonia. The resulting $\Delta^5$-3$\beta$:20:21-trihydroxy-20-pyridyl-(2')-pregnene is acetylated in the customary manner by means of 50 ml. of pyridine and 15 ml. of acetic anhydride, whereby the $\Delta^5$-3$\beta$:21-diacetoxy-20-hydroxy-20-pyridyl-(2')-pregnene is produced. From methanol it crystallises in leaflets of M.P. 159–160° C.;

$[\alpha]_D^{25} = -46° \pm 4 (c. = 0.888$ in chloroform$)$

Example 2

4.95 grams of $\Delta^5$-3$\beta$:21-diacetoxy-20-hydroxy-20-pyridyl-(2')-pregnene are hydrogenated in 80 ml. of glacial acetic acid in the presence of 300 mg. of platinum oxide. After the taking up of 900 ml. of hydrogen, the catalyst is filtered off, the filtrate evaporated under vacuum and 3$\beta$:21-diacetoxy-20-hydroxy-20-piperidyl - (2') - allopregnane isolated by addition of aqueous ammonia. The base is converted directly into the hydrochloride; M.P. over 260° C.

What is claimed is:

1. 3$\beta$:21-diacetoxy-20-hydroxy-20-piperidyl - (2') - allopregnane.
2. $\Delta^5$-3$\beta$:20:21-trihydroxy-20-pyridyl-(2')-pregnene.
3. Therapeutically useful acid addition salts of the compound claimed in claim 2.
4. $\Delta^5$—3$\beta$—R—20—OH—21—R'—20—pyridyl-(2')-pregnene, wherein R and R' are members selected from the group consisting of hydroxy and acetylated hydroxy.
5. Therapeutically useful acid additional salts of the compound claimed in claim 4.
6. A member selected from the group consisting of a compound of the formula

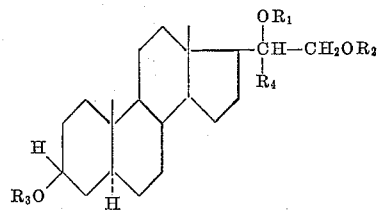

wherein $R_1$ represents hydrogen and $R_2$ and $R_3$ each represent a member selected from the group consisting of a hydrogen atom and an acyl group of a lower aliphatic carboxylic acid, a monocyclic aromatic acid and a monocyclic aryl lower aliphatic acid, and $R_4$ a member selected from the group consisting of the radicals pyridyl-2', piperidyl-2', 1'-methyl-piperidyl-2', 1'-acetyl-piperidyl-2', their derivatives having a double bond in 5,6-position and therapeutically useful N-addition salts thereof.

7. A member selected from the group consisting of a compound of the formula wherein $R_1$ represents hydrogen and $R_2$ and $R_3$ each represent a member selected from the group consisting of a hydrogen atom and an acyl group of a lower aliphatic carboxylic acid, a monocyclic aromatic acid and a monocyclic aryl lower aliphatic acid and $R_4$ a member selected from the group consisting of the radicals pyridyl-2', piperidyl-2', 1'-methyl-piperidyl-2', 1'-acetyl-piperidyl-2', their derivatives having a double bond in 5,6-position and therapeutically useful N-addition salts thereof.

8. Therapeutically useful acid addition salts of the compound claimed in claim 1.

References Cited in the file of this patent

UNITED STATES PATENTS

| | | |
|---|---|---|
| 2,750,380 | Dodson et al. | June 12, 1956 |
| 2,853,487 | Goldberg et al. | Sept. 23, 1958 |